S. J. HUBER AND E. J. SCHWANHAUSSER.
PROCESS AND MECHANISM FOR MELTING BORINGS.
APPLICATION FILED DEC. 7, 1918.
1,309,851.
Patented July 15, 1919.
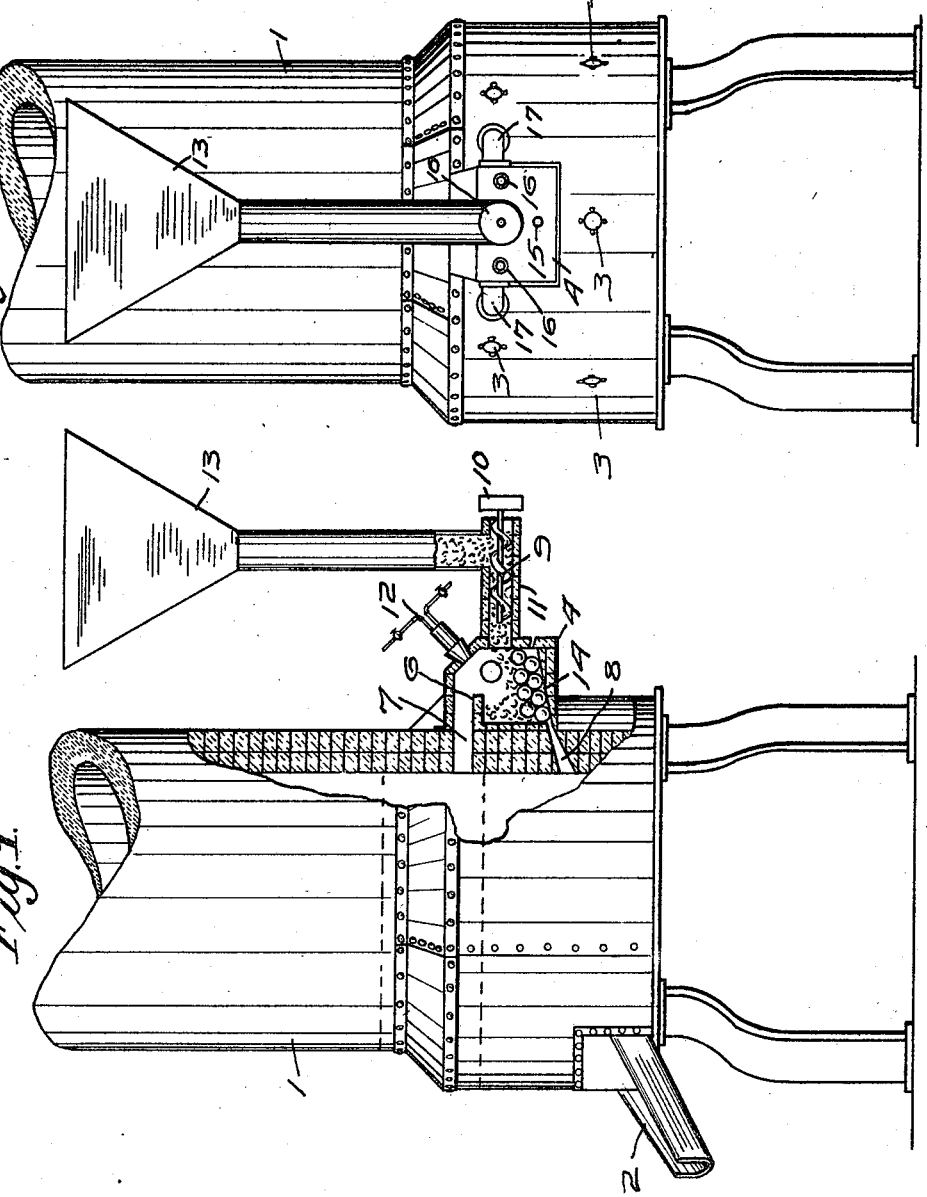
INVENTOR
Samuel J. Huber
Edwin J. Schwanhausser
Owen, Owen & Compton

UNITED STATES PATENT OFFICE.

SAMUEL J. HUBER, OF NEWARK, AND EDWIN J. SCHWANHAUSSER, OF JERSEY CITY, NEW JERSEY.

PROCESS AND MECHANISM FOR MELTING BORINGS.

1,309,851.     Specification of Letters Patent.     Patented July 15, 1919.

Application filed December 7, 1918. Serial No. 265,724.

*To all whom it may concern:*

Be it known that we, SAMUEL J. HUBER, a resident of Newark, in the county of Essex and State of New Jersey, and EDWIN J. SCHWANHAUSSER, a resident of Jersey City, in the county of Hudson and State of New Jersey, citizens of the United States, have invented a certain new and useful Process and Mechanism for Melting Borings; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to the method, and the apparatus in which the method is conducted, for melting borings in connection with the melting of pig and scrap iron, and so that both operations may be conducted at one and the same time and without the formation of the sulfid of iron or the production of injurious compounds and incorporating the same in the cast and without loss of the borings by ejectment by the blast. In the ordinary method of melting of borings and scrap, by reason of the comminutive nature of the material, large quantities of sulfid of iron are formed which practically destroy the cast. Also in the methods now in vogue wherein borings are melted in cupola furnaces, the borings are subjected to the blast, and while such borings may be forced into the cupola by pressure, or may be introduced in compacted form, yet nevertheless the blast will operate on such borings and drive a large portion of them out of the cupola by reason of their fineness or small size, or will prevent them, during the melting operation, to settle with the melting iron. Also by reason of the finely divided condition in which the borings exist they present a large area of surface, in proportion to the volume of material, to the fumes and gases produced in the cupola and an excessive amount of injurious sulfur compound of the iron is produced. The conditions that exist at the present time with reference to the melting of borings and pig and scrap iron are expressed completely in the worth or values of the same material in the two different forms, as found on the market to-day. The furnace men will pay for borings fifteen dollars ($15.00) a ton, while for cast iron they will pay thirty-five dollars ($35.00) a ton.

By our invention this discrepancy is overcome and borings will be placed on exactly the same basis with scrap iron in the market, for by our invention the cast is produced without the sulfidizing of the iron and without abnormal loss of the iron to be melted.

Our invention consists in forming an auxiliary furnace for the melting of the borings and introducing the melted iron into the cupola furnace at a point below the melting zone of the cupola furnace where the melts of the pig and scrap and the borings will intermingle.

The invention may be conducted in apparatus or structures of different forms. We have illustrated in the accompanying drawings a preferred form of a structure containing our invention, and in which the method involving the use of our invention may be conducted.

Figure 1 of the drawings illustrates a partly sectional view and partly side view of the auxiliary and cupola furnaces, and Fig. 2 illustrates a rear end view of the apparatus illustrated in Fig. 1.

1, in the figures, is the ordinary furnace having the discharge trough 2 of the usual form. The iron to be melted and the fuel is built up in the usual way with alternate layers of fuel and pig and scrap iron, the same being thrown in the top of the furnace. It is provided with the usual twyer openings 3 in the vicinity of the bed and the melting zone and through which the usual air draft is directed. By our invention is provided, in conjunction with the cupola furnace, an auxiliary furnace which is suitably supported by or in juxtaposition to, and is connected with, the cupola furnace. The auxiliary furnace 4 is formed of suitable brick and a shell of plate iron in order that it may withstand the heat produced within the auxiliary furnace and give to the auxiliary furnace suitable strength. The auxiliary furnace is preferably built against or forms a part of the wall of the cupola furnace in the vicinity of the melting zone of the furnace. It may be provided with a suitable ledge or deflecting wall 6 for the purpose of concentrating the heat and preventing the loss of the fine material by reason of the blast from the burner. The ledge is located below the point of communication of the auxiliary furnace with the cupola furnace through which the gases of the auxiliary furnace discharge. The passage-way 7 connects the top of the auxiliary furnace with the cupola furnace in order that the vapors and gases of combustion may be conducted from the auxiliary furnace into the cupola furnace and which will add heat units to the cupola furnace.

The heating means of the auxiliary furnace may partake of any form, such as an acetylene blow or an oil heater. If the heater is a gas or oil heater, it is preferably located in the upper outer corner of the auxiliary furnace. In the form of construction shown, we have illustrated, conventionally, an oil heater 12 which is connected with the oil supply and also with the usual source of air pressure or steam supply for the purpose of injectment and atomization of the oil. The direction of the flame produced by the burner or heater is so as to concentrate the heat below the ledge 6 and in the direction of the outlet 8, which is inclined downward and opens into the cupola furnace at a point below the melting zone of the cupola furnace which is located substantially between the dotted lines indicated in Fig. 1. Borings inserted in the auxiliary furnace 4 will thus be melted. As it melts it will enter the cupola furnace at a point below the melting zone and the two melts, namely of the scrap and pig iron in the cupola furnace and of the borings in the auxiliary furnace will mix without forming and incorporating in the cast the objectionable sulfur compounds of iron.

The filings and borings may be introduced into the auxiliary furnace by any suitable means, but we find a preferable form of mechanism for the introduction of the filings that comprises a feed member 9 which may be driven by a suitable motor or drive wheel 10. The feed member 9 is a screw feed and is located in the passage-way formed in a pipe 11 that leads to the auxiliary furnace preferably at the back end and below the burner or heater 12. The pipe 11 may be formed of any suitable material, such as fire brick, and may be surrounded by reinforcing sheet metal for the purpose of strengthening its walls. The borings may be fed to the pipe 11 by means of a suitable hopper 13 which opens into the rear end of the passage-way and above the feed member 9.

The auxiliary furnace is provided with a suitable inclined bottom surface 14 which conducts the melted iron to the inclined outlet or passage-way 8. It may also be provided with a slag hole 15 and the peep holes 16. Suitable blast pipes 17 to supply the requisite amount of air may also be provided and connect the auxiliary furnace with the air box of the furnace. Spherical bricks may be placed in the auxiliary furnace to prevent the filings and borings from being blown out through the opening 8 by the blast in the auxiliary furnace.

We claim:

1. The process of producing cast iron from pig iron, scrap iron and iron borings, which consists in melting the pig iron and scrap iron in a cupola furnace and melting the borings in an auxiliary furnace and directing the melt of the auxiliary furnace into the cupola furnace at a point below the melting zone of the cupola furnace.

2. In an apparatus for melting pig iron, scrap iron and iron borings, an auxiliary furnace having a heater and connected with a suitable source of air pressure for producing a blast in the auxiliary furnace, a cupola furnace, the bottom of the auxiliary furnace connected with the cupola furnace at a point below the melting zone of the cupola furnace for directing the melt of the auxiliary furnace below the melting zone of the cupola furnace.

3. In an apparatus for melting pig iron, scrap iron and iron borings, an auxiliary furnace having a heater and connected with suitable source of air pressure for producing a blast in the auxiliary furnace, a cupola furnace, the bottom of the auxiliary furnace connected with the cupola furnace at a point below the melting zone of the cupola furnace for directing the melt of the auxiliary furnace below the melting zone of the cupola furnace and connected with the cupola furnace at a point about the melting zone of the cupola furnace for directing the products of combustion produced in the auxiliary furnace into the cupola furnace at a point about the melting zone of the cupola furnace.

4. In an apparatus for melting pig iron, scrap iron and iron borings, an auxiliary furnace, means for positively feeding iron borings into the auxiliary furnace above the melting zone of the auxiliary furnace, the auxiliary furnace having a heater, a source of air pressure supply for production of suitable blast in the auxiliary furnace and connected with the auxiliary furnace, a cupola furnace, the auxiliary furnace connected with the cupola furnace at a point below the melting zone of the cupola furnace and a point about the melting zone of the cupola furnace, the first for delivery of the melt of the auxiliary furnace to the cupola furnace and the second for the delivery of the products of combustion in the auxiliary furnace to the cupola furnace at a point above the melting zone.

In testimony whereof we have hereunto signed our names to this specification.

SAMUEL J. HUBER.
EDWIN J. SCHWANHAUSSER.

Copies of this patent may be obtained for five cents each, by addressing the "Commissioner of Patents, Washington, D. C."